(12) United States Patent
Brefeld et al.

(10) Patent No.: US 6,369,549 B1
(45) Date of Patent: Apr. 9, 2002

(54) MOTOR VEHICLE ELECTRICAL SYSTEM WITH MULTIPLE GENERATORS

(75) Inventors: Thomas Edward Brefeld, Dearborn; Eric Steven Schaeffer, Farmington Hills; David Paul Kaminski, Warren, all of MI (US)

(73) Assignee: Ford Global Tech., Inc., Dearborn, MI (US)

(*) Notice: Subject to any disclaimer, the term of this patent is extended or adjusted under 35 U.S.C. 154(b) by 0 days.

(21) Appl. No.: 09/166,253

(22) Filed: Oct. 5, 1998

(51) Int. Cl.[7] .................................................. H02P 3/00
(52) U.S. Cl. ......................................................... 322/11
(58) Field of Search ............................... 322/10, 11, 12; 307/84, 85, 86

(56) References Cited

U.S. PATENT DOCUMENTS

| | | | |
|---|---|---|---|
| 2,504,768 A | | 4/1950 | Watson et al. |
| 3,543,126 A | | 11/1970 | Nolan et al. |
| 3,668,419 A | * | 6/1972 | Cherry et al. .................. 307/84 |
| 3,809,996 A | | 5/1974 | Meisenheimer |
| 3,852,653 A | | 12/1974 | Kuroda et al. |
| 4,074,180 A | * | 2/1978 | Sharpe et al. .................. 307/84 |
| 4,087,698 A | * | 5/1978 | Myers .......................... 307/84 |
| 4,156,836 A | | 5/1979 | Wiley |
| 4,336,485 A | | 6/1982 | Stroud |
| 4,347,473 A | | 8/1982 | Stroud |
| 4,356,402 A | * | 10/1982 | Morimoto et al. ............. 307/85 |
| 4,454,464 A | | 6/1984 | Stroud |
| 4,459,489 A | | 7/1984 | Kirk et al. |
| 4,509,005 A | | 4/1985 | Stroud |
| 4,539,515 A | | 9/1985 | Morishita et al. |
| 4,604,565 A | | 8/1986 | Yokota et al. |
| 4,659,977 A | | 4/1987 | Kissel et al. |
| 4,757,249 A | * | 7/1988 | Farber et al. .................. 307/84 |
| 4,788,486 A | | 11/1988 | Mashino et al. |
| 4,829,228 A | | 5/1989 | Buetemeister |
| 4,908,565 A | * | 3/1990 | Cook et al. .................... 322/10 |
| 5,097,165 A | | 3/1992 | Mashino et al. |
| 5,233,229 A | | 8/1993 | Kohl et al. |
| 5,245,267 A | * | 9/1993 | Pierret et al. .................. 322/99 |
| 5,254,936 A | | 10/1993 | Leaf et al. |
| 5,418,401 A | | 5/1995 | Kaneyuki |
| 5,424,599 A | | 6/1995 | Stroud |
| 5,444,355 A | | 8/1995 | Kaneyuki et al. |
| 5,521,486 A | * | 5/1996 | Takamoto et al. ............. 322/99 |
| 5,600,232 A | | 2/1997 | Eavenson, Sr. et al. |
| 5,612,579 A | * | 3/1997 | Wisbey et al. ................. 307/84 |
| 5,729,059 A | * | 3/1998 | Kilroy et al. .................. 307/84 |
| 5,739,676 A | | 4/1998 | Judge et al. |

* cited by examiner

Primary Examiner—Nestor Ramirez
Assistant Examiner—Peter Medley
(74) Attorney, Agent, or Firm—Ford Global Tech, Inc.

(57) ABSTRACT

A motor vehicle charging system comprises a first alternator including a first power output and a discrete alternator enabling input, a second alternator including a second power output and an electronic controller having a switchable output. The switchable output is coupled to the alternator enabling input. A method for controlling a motor vehicle charging system having a first alternator, a second alternator and a source of switched system voltage having an ON state and an OFF state comprises providing continual enabling power to the first alternator whenever the source of system voltage is in the ON state. The method also includes providing switchable enabling power to the second alternator whenever the source of system voltage is in the ON state. Alternatively, the method for controlling a motor vehicle charging system comprises providing continual enabling power to the first alternator whenever the vehicle's engine is running and providing switchable enabling power to the second alternator, also whenever the vehicle's engine is running.

5 Claims, 1 Drawing Sheet

MOTOR VEHICLE ELECTRICAL SYSTEM WITH MULTIPLE GENERATORS

BACKGROUND OF THE INVENTION

1. Field of the Invention

The present invention relates to motor vehicle electrical systems having multiple electrical generators.

2. Description of the Related Art

Some motor vehicles have accessories with particularly high electrical loads. An example of one such motor vehicle is an ambulance. In motor vehicles with high electrical loads, generating the electrical power required can be a challenge.

One possible way to generate the electrical power required is through the use of a very high capacity alternator. However, the larger the power generating capability an alternator has, the larger the physical volume the alternator will occupy. Packaging constraints in many motor vehicles preclude the use of a single, very large alternator.

An alternative way to generate the required electrical power is through the use of two or more smaller alternators. The smaller alternators, although perhaps occupying a greater total physical volume than a single larger alternator, provide greater packaging flexibility. That is, space may be more readily available for two smaller alternators than for one large alternator.

In a particular vehicle system having two alternators, an issue has been identified. Where both alternators generate power while the glow plugs of a diesel engine are commanded ON, the voltage provided to the glow plugs is likely to exceed the voltage threshold at which protection measures for the glow plugs take effect. Such measures include cycling the power to the glow plugs to protect them from damage. Cycling the very large current consumed by the glow plugs (up to 100 amperes) can disrupt the idle control system of the vehicle and cause a fluctuating idle speed. This can be a source of customer dissatisfaction. Turning off one of the alternators when the glow plugs are energized will reduce the likelihood of this condition.

There are also other situations where it would be beneficial to turn off one alternator of a dual alternator system. For example, during wide-open-throttle acceleration, turning off one alternator would temporarily reduce the mechanical load on the engine, allowing greater acceleration capability for the vehicle. Also, during idle, reducing the mechanical load on the engine by turning off one alternator will help control the engine's idle speed within a precise range. Further, reducing the mechanical load on the engine during crank will help assure that sufficient cranking speed is maintained for enough time to start the engine.

Thus, a multiple-alternator system which allows for selective disabling of one of the alternators will provide system performance advantages over alternative systems.

SUMMARY OF THE INVENTION

The present invention provides a motor vehicle charging system comprising a first alternator including a first power output and a discrete alternator enabling input, a second alternator including a second power output and an electronic controller having a switchable output. The switchable output is coupled to the alternator enabling input.

The present invention also provides a method for controlling a motor vehicle charging system having a first alternator, a second alternator and a source of switched system voltage having an ON state and an OFF state. The method comprises providing continual enabling power to the first alternator whenever the source of system voltage is in the ON state. The method also includes providing switchable enabling power to the second alternator whenever the source of system voltage is in the ON state.

The present invention further provides a second method for controlling a motor vehicle charging system having a first alternator, a second alternator and a source of switched system voltage having an ON state and an OFF state, and wherein the motor vehicle includes an engine. The method comprises providing continual enabling power to the first alternator whenever the engine is running. The method additionally comprises providing switchable enabling power to the second alternator whenever the engine is running.

By allowing for selective enabling of an alternator in a multiple alternator system, the present invention provides operational advantages over alternative system designs.

DETAILED DESCRIPTION OF THE PREFERRED EMBODIMENT

Figure 1:
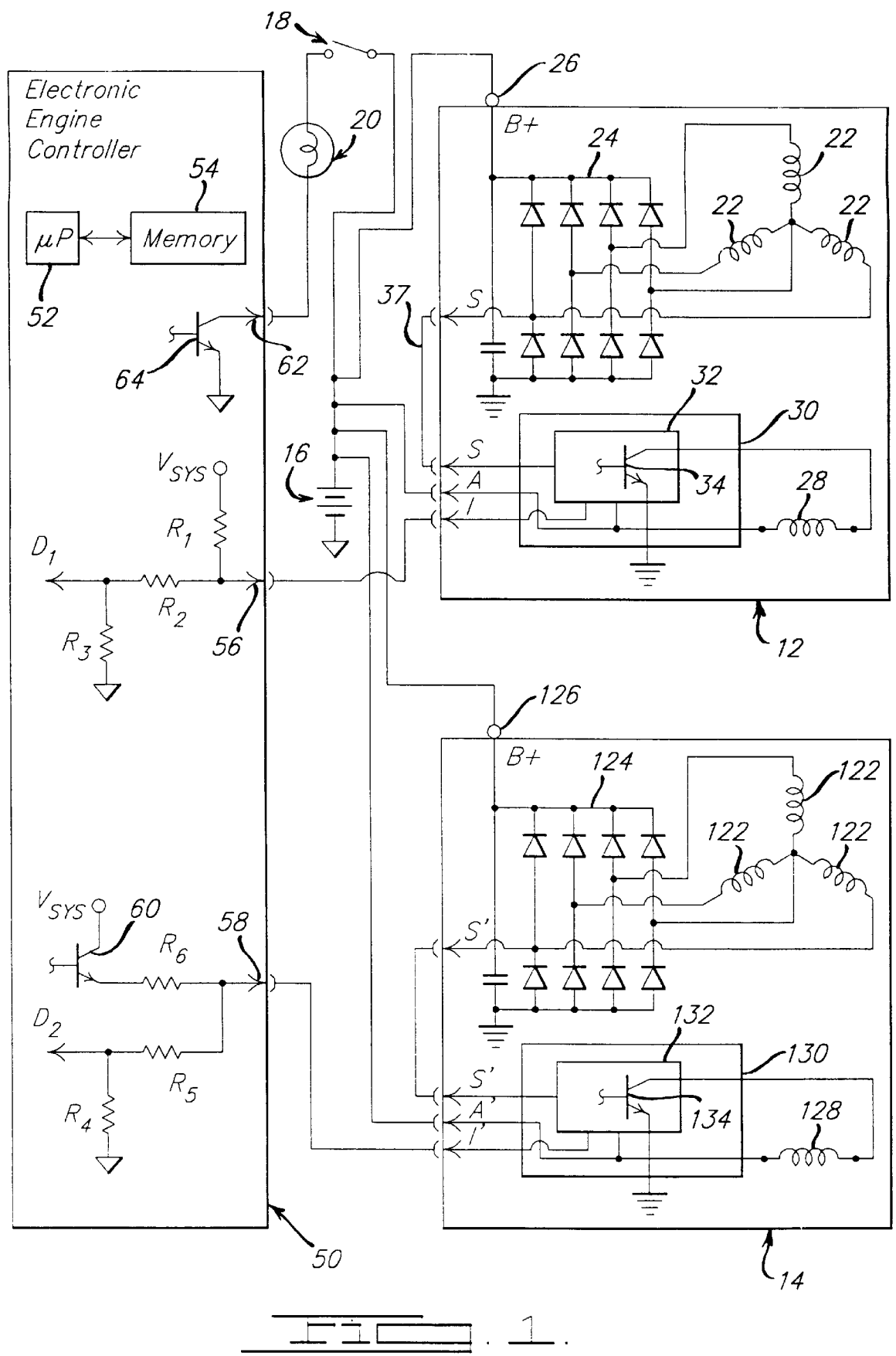
FIG. 1 is a schematic diagram of a multiple alternator system according to one embodiment of the present invention.

Referring to FIG. 1, a multiple alternator system according to one embodiment of the present invention will be described. The system includes two alternators, labeled 12 and 14. The system also includes one or more vehicle batteries 16, typically though not necessarily 12-volt batteries. Additionally, the system includes an ignition switch 18 and a generating system diagnostic indicator 20.

Alternator 12 further includes three power output windings 22. As is apparent, alternator 12 is a three-phase machine, though the present invention is not so limited. Alternator 12 also includes a rectifier 24. Rectifier 24 includes diodes which rectify the alternating current (AC) outputs of power output windings 22 into direct current (DC) at DC power output 26 of alternator 12. Alternator 12 also includes a field coil 28, which is in electromagnetic communication with power output windings 22.

Also included in alternator 12 is a voltage regulator 30. Voltage regulator 30 includes circuitry 32 which further includes an electrical driver 34. Through sensing the voltage at terminal "A", voltage regulator 30 modulates the current through field coil 28 to maintain the output voltage of alternator 12 (as sensed by terminal "A") at a predetermined target value. Electrical driver 34 is preferably a solid-state device.

Circuitry 32 in regulator 30 also provides a number of diagnostic functions to determine whether alternator 12 is operating properly. For example, via circuit 37 connecting the two "S" terminals of alternator 12, regulator 30 monitors the output voltage of one of the power output windings 22. If an alternating voltage (that is, an AC signal) is not detected, regulator 30 concludes that alternator 12 is not generating power. This can be due to a number of causes internal to alternator 12 (e.g., a short circuit or open circuit in a number of places) or external to alternator 12 (e.g., the belt which mechanically drives alternator 12 being broken). Another diagnostic function performed by regulator 30 is monitoring the voltage at the "A" terminal. If the voltage is very high (above, say, 20 volts or so in a 12-volt system), an overvoltage condition at output 26 of alternator 12 is indicated.

Alternator 12 also includes an "I" terminal. In a prior art vehicle electrical system, the "I" terminal is traditionally coupled to a charging system warning lamp which is itself pulled up to system voltage switched by the ignition switch of the vehicle. The "I" terminal typically performs a dual role. First, it is through the "I" terminal that voltage regulator 30 receives a logic "high" signal that the ignition switch is on and that the alternator should operate. Typically, a voltage above about 1.2 volts would indicate that the alternator should be ON, and a voltage below about 0.5 volts would indicate that the alternator should be OFF. Second, in the event of any of the numerous possible malfunctions of the alternator, the voltage regulator can pull the "I" terminal to a logic "low" state, thereby illuminating the charging system warning lamp. The "I" terminal thus performs a diagnostic information function. Typically, in the event of a malfunction, the voltage regulator would pull the "I" circuit to a "LOW" state; where there is no malfunction, the "I" circuit would be at a "HIGH" state.

In the vehicle electrical system shown in FIG. 1, the "I" terminal of alternator 12 is coupled to electronic engine controller (EEC) 50. The circuitry within EEC 50 and its interaction with the "I" terminal of alternator 12 will be discussed below.

The system of FIG. 1 also includes an alternator 14. Alternator 14 is identical to alternator 12, each of these devices being a standard alternator according to conventional design. The internal components of alternator 14 are numbered the same as the components of alternator 12, with the addition of a leading "1". The "I" terminal of alternator 14 (designated "I'" in FIG. 1 to distinguish it from the "I" terminal of alternator 12) is coupled to EEC 50.

EEC 50 is an electronic engine controller or other electronic control module on the vehicle. EEC 50 has a microprocessor 52, memory 54 and other sufficient microcomputer resources to perform the functions ascribed to it herein.

Terminal 56 of EEC 50 is coupled to the "I" terminal of alternator 12. Coupled to terminal 56 is a pull-up resistor $R_1$ coupled to $V_{sys}$, which is typically 12 volts whenever ignition switch 18 is on to power EEC 50. Also coupled to terminal 56 of electronic controller 50 are resistors $R_2$ and $R_3$, which provide a suitable voltage divider so that the voltage at terminal 56 can be read by discrete input $D_1$. Discrete input $D_1$ may be a terminal on microprocessor 52 or on a separate input/output (I/O) integrated circuit which provides the state of discrete input $D_1$ to microprocessor 52.

The "I" terminal of alternator 14 is coupled to terminal 58 of EEC 50. Coupled to terminal 58 are resistors $R_4$ and $R_5$, which provide a suitable voltage divider so that the voltage at terminal 58 can be read by discrete input $D_2$. Also coupled to terminal 58 is a high-side driver 60, which is under the control of microprocessor 52. High-side driver 60 provides switchable voltage to the "I" terminal of alternator 14. Through the control of high-side driver 60, power generation by alternator 14 can be turned ON (if high-side driver 60 is in a conducting state) or turned OFF (if high-side driver 60 is in a non-conducting state).

Charging system warning indicator 20, typically an incandescent bulb, is pulled up to battery voltage via ignition switch 18. On its low side, charging system warning indicator 20 is coupled to terminal 62 of EEC 50. Also coupled to terminal 62 is low-side driver 64, which is under control of microprocessor 52. EEC 50 thus has control of charging system warning indicator 20. In a typical motor vehicle having a single alternator, charging system warning indicator 20 would be coupled to the alternator and under the alternator's control.

EEC 50 senses the voltages at terminals 56 and 58 (provided by the "I" terminals of alternators 12 and 14) in order to detect a voltage level which indicates a fault condition which would illuminate the charging system warning lamp in a vehicle where such lamp is directly coupled for control by the alternator. EEC 50 will then illuminate charging system warning indicator 20. Also, EEC 50 can log a fault code in memory 54 to indicate which alternator, 12 or 14, is detected to have a fault.

In the event that a motor vehicle electrical system has only a single alternator, that alternator would not be coupled to EEC 50. The alternator would simply be wired in its traditional manner, wherein the "I" terminal is coupled via the charging system warning indicator 20 to system voltage switched by ignition switch 18. In order to make EEC 50 flexible enough such that no software or hardware modification is necessary in this case, EEC 50 includes logic to detect whether alternators 12 and 14 are coupled to EEC 50. EEC 50 performs this detection when ignition switch 18 is on but the engine is not running. This condition is one in which alternators 12 and 14 would pull their "I" terminals low to light a charging system warning light. In the present system, however, EEC 50 can detect whether the "I" terminals are pulled low. If YES, then EEC 50 knows that alternators 12 and 14 are coupled to EEC 50. If NO, then EEC 50 know that alternators 12 and 14 are not so coupled. EEC 50 can also perform an open circuit diagnostic test at terminal 62 to determine whether charging system warning indicator 20 is coupled to EEC 50. Such an open circuit test can be performed by "smart" outputs having open-circuit detection capability, which are well-known to those in the electronic arts.

Through EEC 50's control of the voltage at the "I" terminal of alternator 14, EEC 50 can turn alternator 14 ON and OFF. Thus, during wide-open throttle accelerations, engine idle and/or engine cranking events, EEC 50 can turn off alternator 14 in order to reduce the mechanical load on the engine. Further, where the vehicle has a diesel engine, alternator 14 can be turned off when the engine's glow plugs are on, thereby preventing protective cycling of power to the glow plugs. This will enhance idle stability.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A motor vehicle charging system comprising:

a first alternator including a first power output, a first discrete alternator enabling input, and a first alternator diagnostic output;

a second alternator including a second power output and a second alternator diagnostic output;

an electronic controller having a switchable output, a first input and a second input, said switchable output including a driver which is coupled to said alternator enabling input and which is effective to selectively enable and disable said first alternator, said first input being coupled to said first alternator diagnostic output and said second input being coupled to said second alternator diagnostic output; and wherein said electronic controller further comprises memory and comprises logic for monitoring said first diagnostic output and said second diagnostic output and logging fault conditions of either said alternator in said memory.

2. A motor vehicle charging system as recited in claim 1, wherein said electronic controller further includes logic for learning whether said first and second diagnostic outputs are coupled to said electronic controller and disabling said logging of fault conditions if said first and second alternators are not coupled to said electronic controller.

3. A motor vehicle charging system comprising:

a first alternator including a first power output, a first discrete alternator enabling input, and a first alternator diagnostic output;

a second alternator including a second power output and a second alternator diagnostic output;

an electronic controller having a switchable output, a first input and a second input, said switchable output including a driver which is coupled to said alternator enabling input and which is effective to selectively enable and disable said first alternator, said first input being coupled to said first alternator diagnostic output and said second input being coupled to said second alternator diagnostic output; and wherein said second alternator diagnostic output also functions as a discrete enabling input for said second alternator, and wherein said second input further comprises means for enabling said second alternator via said enabling input of said second alternator.

4. A motor vehicle charging system as recited in claim 3, wherein said means for enabling is a pull-up resistor.

5. A motor vehicle charging system comprising:

a first alternator including a first power output, a first discrete alternator enabling input, and a first alternator diagnostic output;

a second alternator including a second power output, a second discrete alternator enabling input, and a second alternator diagnostic output;

an electronic controller having a switchable output, a first input and a second input, and means for enabling said second alternator via said second discrete alternator enabling input, said switchable output including a driver which is coupled to said alternator enabling input and which is effective to selectively enable and disable said first alternator, said first input being coupled to said first alternator diagnostic output and said second input being coupled to said second alternator diagnostic output; and wherein said means for enabling said second alternator is a pull-up resistor in said electronic controller.

\* \* \* \* \*